US00RE50820E

(19) United States
(12) Reissued Patent
Lee et al.

(10) Patent Number: US RE50,820 E
(45) Date of Reissued Patent: Mar. 10, 2026

(54) METHOD AND APPARATUS FOR REQUESTING SIB IN WIRELESS COMMUNICATION SYSTEM

(71) Applicant: LG ELECTRONICS INC., Seoul (KR)

(72) Inventors: Youngdae Lee, Seoul (KR); Sangwon Kim, Seoul (KR); Jaewook Lee, Seoul (KR)

(73) Assignee: LG ELECTRONICS INC., Seoul (KR)

(21) Appl. No.: 17/896,641

(22) Filed: Aug. 26, 2022

Related U.S. Patent Documents

Reissue of:
(64) Patent No.: 10,771,931
Issued: Sep. 8, 2020
Appl. No.: 16/300,216
Filed: Nov. 9, 2018

U.S. Applications:
(60) Provisional application No. 62/366,643, filed on Jul. 26, 2016, provisional application No. 62/334,443,
(Continued)

(51) Int. Cl.
*H04W 4/06* (2009.01)
*H04L 1/1607* (2023.01)
(Continued)

(52) U.S. Cl.
CPC ..... *H04W 4/06* (2013.01); *H04L 1/1614* (2013.01); *H04W 4/70* (2018.02); *H04W 36/249* (2023.05);
(Continued)

(58) Field of Classification Search
CPC ..... H04W 4/06; H04W 48/14; H04W 4/70; H04W 76/27; H04W 36/249; H04W 68/02; H04W 84/042; H04L 1/1614
See application file for complete search history.

(56) References Cited

U.S. PATENT DOCUMENTS 9,357,476 B2 * 5/2016 Hegde ..... H04W 48/16
10,257,772 B2 * 4/2019 Johansson ..... H04W 48/14
(Continued)

FOREIGN PATENT DOCUMENTS

KR 10-2009-0030446 A 3/2009
KR 10-2013-0111476 A 10/2013
WO 2008/111014 A2 9/2008

OTHER PUBLICATIONS

Ericsson, "SI message scheduling for NB-IoT", R2-163256, 3GPP TSG-RAN WG2 Meeting NB-IOT ad-hoc, Sophia-Antipolis, France, May 3-4, 2016, See section 2.1.
(Continued)

*Primary Examiner* — Charles R Craver
(74) *Attorney, Agent, or Firm* — BRYAN CAVE LEIGHTON PAISNER LLP

(57) ABSTRACT

Provided are a method for a terminal for requesting a system information block (SIB), and an apparatus for supporting the method in a wireless communication system. The method may comprise the steps of: receiving, from a radio access network (RAN), an SIB list comprising one or more SIBs supported by a cell; receiving, from the RAN, SIB broadcast information indicating whether the SIB supported by the cell is broadcast in a broadcast control channel (BCCH) section; detecting an omitted SIB on the basis of the SIB list and SIB broadcast information; and requesting the omitted SIB from the RAN.

17 Claims, 16 Drawing Sheets

Related U.S. Application Data filed on May 10, 2016, provisional application No. 62/334,427, filed on May 10, 2016, provisional application No. 62/334,418, filed on May 10, 2016.

(51) Int. Cl.

| | |
|---|---|
| ***H04W 4/70*** | (2018.01) |
| ***H04W 36/24*** | (2009.01) |
| ***H04W 48/14*** | (2009.01) |
| ***H04W 68/02*** | (2009.01) |
| ***H04W 76/27*** | (2018.01) |
| ***H04W 84/04*** | (2009.01) |

(52) U.S. Cl.

CPC ..... *H04W 48/14* (2013.01); *H04W 68/02* (2013.01); *H04W 76/27* (2018.02); *H04W 84/042* (2013.01)

(56) References Cited

U.S. PATENT DOCUMENTS

| | | | | |
|---|---|---|---|---|
| 10,455,621 | B2 * | 10/2019 | Agiwal | H04W 74/0833 |
| 10,674,380 | B2 * | 6/2020 | Ishii | H04W 36/0066 |
| 2003/0069008 | A1 | 4/2003 | Nakazawa et al. | |
| 2007/0260851 | A1 * | 11/2007 | Taha | H04W 52/0229 712/204 |
| 2008/0207228 | A1 * | 8/2008 | Catovic | H04W 68/02 455/458 |
| 2008/0287134 | A1 * | 11/2008 | Catovic | H04W 68/02 455/445 |
| 2009/0270104 | A1 * | 10/2009 | Du | H04W 48/02 455/436 |
| 2011/0117912 | A1 * | 5/2011 | Mahajan | H04W 48/12 455/434 |
| 2011/0320856 | A1 * | 12/2011 | Deivasigamani | H04L 1/0053 714/2 |
| 2012/0100846 | A1 | 4/2012 | Saini et al. | |
| 2012/0157090 | A1 * | 6/2012 | Kim | H04W 24/08 455/424 |
| 2015/0057046 | A1 * | 2/2015 | Challa | H04W 48/12 455/558 |
| 2015/0382284 | A1 * | 12/2015 | Brismar | H04W 48/12 370/329 |
| 2016/0234735 | A1 * | 8/2016 | Kubota | H04W 48/14 |
| 2017/0311285 | A1 * | 10/2017 | Ly | H04W 74/0833 |
| 2018/0110037 | A1 * | 4/2018 | Yasukawa | H04W 76/14 |
| 2018/0146404 | A1 * | 5/2018 | Zhang | H04W 72/044 |
| 2018/0227833 | A1 * | 8/2018 | Belleschi | H04W 48/12 |
| 2020/0100083 | A1 * | 3/2020 | Lee | H04W 68/005 |

OTHER PUBLICATIONS

Samsung, "System Information for In-band NB-IoT", R2-161407, 3GPP TSG RAN WG2 RAN2#93 Meeting, St. Julian's, Malta, Feb. 15-19, 2016, See section 2.

* cited by examiner (a)

(b)

METHOD AND APPARATUS FOR REQUESTING SIB IN WIRELESS COMMUNICATION SYSTEM

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

This application is a *reissue of U.S. Pat. No. 10,771,931, which issued Sep. 8, 2020 from U.S. patent application Ser. No. 16/300,216, filed Nov. 9, 2018, which is a* National Stage filing under 35 U.S.C. 371 of International No. PCT/KR2017/004792, filed on May 10, 2017, which claims the benefit of U.S. Provisional Applications No. 62/334,418, filed May 10, 2016, No. 62/334,427 filed on May 10, 2016, No. 62/334,443 filed on May 10, 2016, and No. 62/366,643 filed on Jul. 26, 2016, the contents of which are all hereby incorporated by reference herein in their entirety.

BACKGROUND OF THE INVENTION

Field of the Invention

The present invention relates to a wireless communication system and, more particularly, to a method for a user equipment (UE) to request a missing system information block (SIB) in a wireless communication system, and an apparatus for supporting the same.

Related Art

In order to meet the demand for wireless data traffic soring since the 4th generation (4G) communication system came to the market, there are ongoing efforts to develop enhanced 5th generation (5G) communication systems or pre-5G communication systems. For the reasons, the 5G communication system or pre-5G communication system is called the beyond 4G network communication system or post long-term evolution (LTE) system.

In order to accomplish a higher data transfer rate, the 5G communication system considers implementation at a super-high frequency (mmWave) band (e.g., such as a 60 GHz band). In order to obviate a path loss of a radio wave and increase a delivery distance of a radio wave at the super-high frequency band, various techniques such as a beamforming, a massive MIMO, a full dimensional MIMO (FD-MIMO), an array antenna, an analog beam-forming, and a large scale antenna are discussed in the 5G communication system.

Additionally, for an improvement in network of the 5G communication system, technical developments are made in an advanced small cell, a cloud radio access network (cloud RAN), an ultra-dense network, a device to device (D2D) communication, a wireless backhaul, a moving network, a cooperative communication, coordinated multi-points (CoMP), a reception interference cancellation, and the like.

Besides, in the 5G communication system, a hybrid FSK and QAM modulation (FQAM) and a sliding window superposition coding (SWSC) are developed as advanced coding modulation (ACM) schemes, and a filter bank multi carrier (FBMC), a non orthogonal multiple access (NOMA), and a sparse code multiple access (SCMA) are also developed as advanced access techniques.

System information refers to essential information for communication between a terminal and a base station. In 3GPP LTE, the system information is divided into an MIB (Master Information Block) and an SIB (System Information Block). The MIB is the most essential information. The SIB is subdivided into SIB-x forms according to its importance or cycle. The MIB is transmitted through a PBCH (Physical Broadcast Channel) which is a physical channel. The SIB is common control information and is transmitted through a PDCCH differently from the MIB.

SUMMARY OF THE INVENTION

Meanwhile, the number of system information blocks is continuously increasing, and radio resources are required to broadcast a system information block. Thus, as the number of system information blocks increases, the quantity of radio resources required to broadcast a system information block also inevitably increases. To transmit continuously increasing system information to a user equipment (UE), it is necessary to propose a method for acquiring system information that efficiently utilizes radio resources.

According to an embodiment, there is provided a method for requesting, by a user equipment (UE), a system information block (SIB) in a wireless communication system. The method may include: receiving an SIB list including one or more SIBs supported by a cell from a radio access network (RAN); receiving, from the RAN, SIB broadcast information indicating whether an SIB supported by the cell is broadcast in a broadcast control channel (BCCH) period; detecting a missing SIB based on the SIB list and the SIB broadcast information; and requesting the missing SIB from the RAN.

The missing SIB may be an SIB that is not broadcasted in the BCCH period among the SIBs included in the SIB list. The BCCH period may be a current BCCH period or a next BCCH period.

The BCCH period may be one of a BCCH modification period or a BCCH repetition period.

The missing SIB may be an SIB that the UE needs to receive from the RAN in order to perform a particular service. The particular service may include at least one of a multimedia broadcast/multicast service (MBMS) service, a device-to-device (D2D) service, a vehicle-to-everything (V2X) service, or wireless local area network (WLAN) interworking.

The missing SIB may be requested from the RAN by indicating a service associated with the missing SIB.

The SIB list and the SIB broadcast information may be received by the UE via particular system information. The particular system information may be system information that is always broadcast by the RAN.

The method may further include receiving a probability factor from the RAN, wherein when a random number drawn by the UE is less than or equal to the probability factor, the missing SIB may be requested from the RAN.

The method may further include receiving, from the RAN, a value tag indicating system information to be requested from the RAN, wherein when the missing SIB is system information indicated by the value tag, the missing SIB may be requested from the RAN.

The method may further include receiving, from the RAN, a number of a type of an SIB to be requested from the RAN, wherein when the missing SIB matches the number of the type of the SIB to be requested, the missing SIB may be requested from the RAN.

The method may further include receiving, from the RAN, a set of SIBs to be requested from the RAN, wherein when the missing SIB is included in the set of SIBs to be requested, the missing SIB may be requested from the RAN.

The method may further include receiving the missing SIB from the RAN in response to the request.

According to another embodiment, there is provided a UE for requesting an SIB in a wireless communication system. The UE may include: a memory; a transceiver; and a processor to connect the memory and the transceiver, wherein the processor may be configured to: control the transceiver to receive an SIB list including one or more SIBs supported by a cell from an RAN; control the transceiver to receive, from the RAN, SIB broadcast information indicating whether an SIB supported by the cell is broadcast in a broadcast control channel (BCCH) period; detect a missing SIB based on the SIB list and the SIB broadcast information; and control the transceiver to request the missing SIB from the RAN.

A UE may receive a missing SIB.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802.20, evolved UTRA (E-UTRA), etc. IEEE 802.16m is evolved from IEEE 802.16e, and provides backward compatibility with a system based on the IEEE 802.16e. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE. 5G is an evolution of the LTE-A.

For clarity, the following description will focus on LTE-A. However, technical features of the present invention are not limited thereto.

Figure 1:
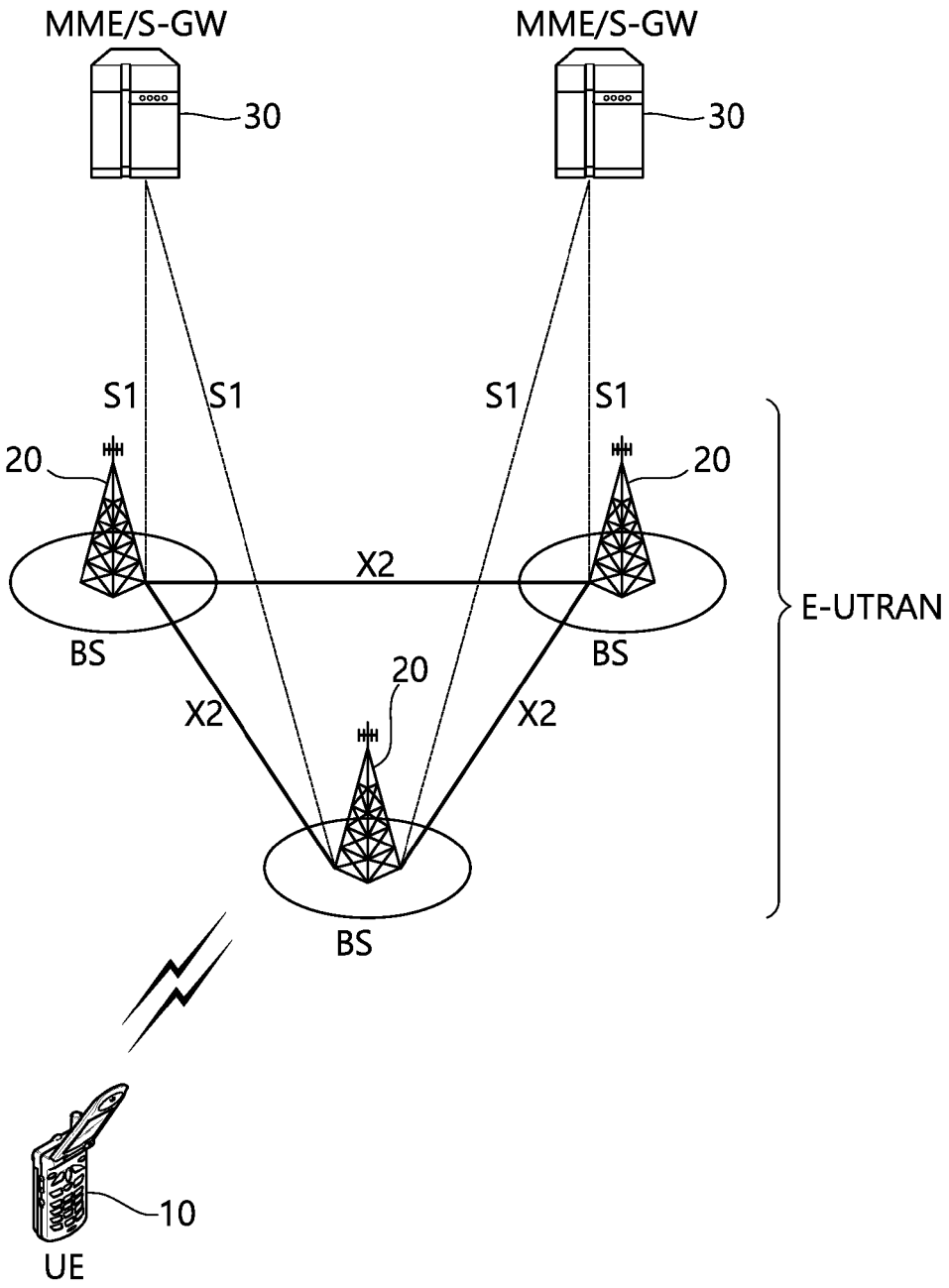
FIG. 1 shows LTE system architecture.

FIG. 1 shows LTE system architecture. The communication network is widely deployed to provide a variety of communication services such as voice over internet protocol (VoIP) through IMS and packet data.

Referring to FIG. 1, the LTE system architecture includes one or more user equipment (UE; 10), an evolved-UMTS terrestrial radio access network (E-UTRAN) and an evolved packet core (EPC). The UE 10 refers to a communication equipment carried by a user. The UE 10 may be fixed or mobile, and may be referred to as another terminology, such as a mobile station (MS), a user terminal (UT), a subscriber station (SS), a wireless device, etc.

The E-UTRAN includes one or more evolved node-B (eNB) 20, and a plurality of UEs may be located in one cell. The eNB 20 provides an end point of a control plane and a user plane to the UE 10. The eNB 20 is generally a fixed station that communicates with the UE 10 and may be referred to as another terminology, such as a base station (BS), a base transceiver system (BTS), an access point, etc. One eNB 20 may be deployed per cell. There are one or more cells within the coverage of the eNB 20. A single cell is configured to have one of bandwidths selected from 1.25, 2.5, 5, 10, and 20 MHz, etc., and provides downlink or uplink transmission services to several UEs. In this case, different cells can be configured to provide different bandwidths.

Hereinafter, a downlink (DL) denotes communication from the eNB 20 to the UE 10, and an uplink (UL) denotes communication from the UE 10 to the eNB 20. In the DL, a transmitter may be a part of the eNB 20, and a receiver may be a part of the UE 10. In the UL, the transmitter may be a part of the UE 10, and the receiver may be a part of the eNB 20.

The EPC includes a mobility management entity (MME) which is in charge of control plane functions, and a system architecture evolution (SAE) gateway (S-GW) which is in charge of user plane functions. The MME/S-GW 30 may be positioned at the end of the network and connected to an external network. The MME has UE access information or UE capability information, and such information may be primarily used in UE mobility management. The S-GW is a gateway of which an endpoint is an E-UTRAN. The MME/S-GW 30 provides an end point of a session and mobility management function for the UE 10. The EPC may further include a packet data network (PDN) gateway (PDN-GW). The PDN-GW is a gateway of which an endpoint is a PDN.

The MME provides various functions including non-access stratum (NAS) signaling to eNBs 20, NAS signaling security, access stratum (AS) security control, Inter core network (CN) node signaling for mobility between 3GPP access networks, idle mode UE reachability (including control and execution of paging retransmission), tracking area list management (for UE in idle and active mode), P-GW and S-GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g., deep packet inspection), lawful interception, UE Internet protocol (IP) address allocation, transport level packet marking in the DL, UL and DL service level charging, gating and rate enforcement, DL rate enforcement based on APN-AMBR. For clarity MME/S-GW 30 will be referred to herein simply as a "gateway," but it is understood that this entity includes both the MME and S-GW.

Interfaces for transmitting user traffic or control traffic may be used. The UE 10 and the eNB 20 are connected by means of a Uu interface. The eNBs 20 are interconnected by means of an X2 interface. Neighboring eNBs may have a meshed network structure that has the X2 interface. The eNBs 20 are connected to the EPC by means of an S1 interface. The eNBs 20 are connected to the MME by means of an S1-MME interface, and are connected to the S-GW by means of S1-U interface. The S1 interface supports a many-to-many relation between the eNB 20 and the MME/S-GW.

The eNB 20 may perform functions of selection for gateway 30, routing toward the gateway 30 during a radio resource control (RRC) activation, scheduling and transmitting of paging messages, scheduling and transmitting of broadcast channel (BCH) information, dynamic allocation of resources to the UEs 10 in both UL and DL, configuration and provisioning of eNB measurements, radio bearer control, radio admission control (RAC), and connection mobility control in LTE_ACTIVE state. In the EPC, and as noted above, gateway 30 may perform functions of paging origination, LTE_IDLE state management, ciphering of the user plane, SAE bearer control, and ciphering and integrity protection of NAS signaling.

Figure 2:
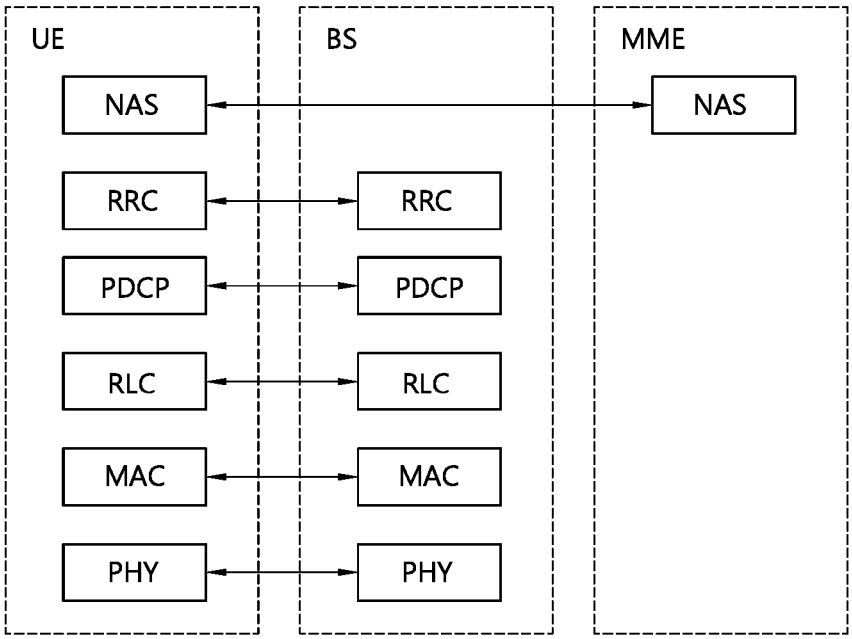
FIG. 2(a) shows a control plane of a radio interface protocol of an LTE system.
FIG. 2(b) shows a user plane of a radio interface protocol of an LTE system.
Figure 2:
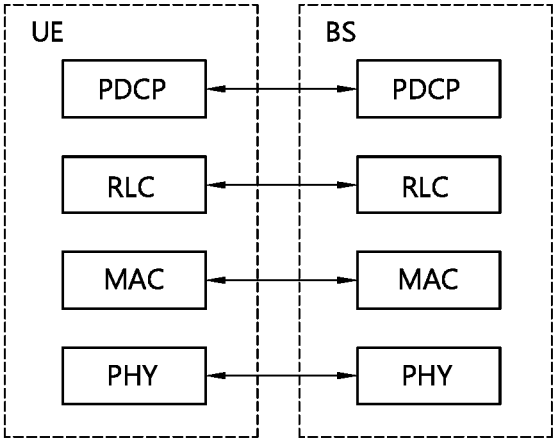

FIG. 2(a) shows a control plane of a radio interface protocol of an LTE system. FIG. 2(b) shows a user plane of a radio interface protocol of an LTE system.

Layers of a radio interface protocol between the UE and the E-UTRAN may be classified into a first layer (L1), a second layer (L2), and a third layer (L3) based on the lower three layers of the open system interconnection (OSI) model that is well-known in the communication system. The radio interface protocol between the UE and the E-UTRAN may be horizontally divided into a physical layer, a data link layer, and a network layer, and may be vertically divided into a control plane (C-plane) which is a protocol stack for control signal transmission and a user plane (U-plane) which is a protocol stack for data information transmission. The layers of the radio interface protocol exist in pairs at the UE and the E-UTRAN, and are in charge of data transmission of the Uu interface.

A physical (PHY) layer belongs to the L1. The PHY layer provides a higher layer with an information transfer service through a physical channel. The PHY layer is connected to a medium access control (MAC) layer, which is a higher layer of the PHY layer, through a transport channel. A physical channel is mapped to the transport channel Data is transferred between the MAC layer and the PHY layer through the transport channel. Between different PHY layers, i.e., a PHY layer of a transmitter and a PHY layer of a receiver, data is transferred through the physical channel using radio resources. The physical channel is modulated using an orthogonal frequency division multiplexing (OFDM) scheme, and utilizes time and frequency as a radio resource.

The PHY layer uses several physical control channels. A physical downlink control channel (PDCCH) reports to a UE about resource allocation of a paging channel (PCH) and a downlink shared channel (DL-SCH), and hybrid automatic repeat request (HARQ) information related to the DL-SCH. The PDCCH may carry a UL grant for reporting to the UE about resource allocation of UL transmission. A physical control format indicator channel (PCFICH) reports the number of 01-DM symbols used for PDCCHs to the UE, and is transmitted in every subframe. A physical hybrid ARQ indicator channel (PHICH) carries an HARQ acknowledgement (ACK)/non-acknowledgement (NACK) signal in response to UL transmission. A physical uplink control channel (PUCCH) carries UL control information such as HARQ ACK/NACK for DL transmission, scheduling request, and CQI. A physical uplink shared channel (PUSCH) carries a UL-uplink shared channel (SCH).

A physical channel consists of a plurality of subframes in time domain and a plurality of subcarriers in frequency domain. One subframe consists of a plurality of symbols in the time domain. One subframe consists of a plurality of resource blocks (RBs). One RB consists of a plurality of symbols and a plurality of subcarriers. In addition, each subframe may use specific subcarriers of specific symbols of a corresponding subframe for a PDCCH. For example, a first symbol of the subframe may be used for the PDCCH. The PDCCH carries dynamic allocated resources, such as a physical resource block (PRB) and modulation and coding scheme (MCS). A transmission time interval (TTI) which is a unit time for data transmission may be equal to a length of one subframe. The length of one subframe may be 1 ms.

The transport channel is classified into a common transport channel and a dedicated transport channel according to whether the channel is shared or not. A DL transport channel for transmitting data from the network to the UE includes a broadcast channel (BCH) for transmitting system information, a paging channel (PCH) for transmitting a paging message, a DL-SCH for transmitting user traffic or control signals, etc. The DL-SCH supports HARQ, dynamic link adaptation by varying the modulation, coding and transmit power, and both dynamic and semi-static resource allocation. The DL-SCH also may enable broadcast in the entire cell and the use of beamforming. The system information carries one or more system information blocks. All system information blocks may be transmitted with the same periodicity. Traffic or control signals of a multimedia broadcast/multicast service (MBMS) may be transmitted through the DL-SCH or a multicast channel (MCH).

A UL transport channel for transmitting data from the UE to the network includes a random access channel (RACH)

for transmitting an initial control message, a UL-SCH for transmitting user traffic or control signals, etc. The UL-SCH supports HARQ and dynamic link adaptation by varying the transmit power and potentially modulation and coding. The UL-SCH also may enable the use of beamforming. The RACH is normally used for initial access to a cell.

A MAC layer belongs to the L2. The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel A MAC sublayer provides data transfer services on logical channels.

The logical channels are classified into control channels for transferring control plane information and traffic channels for transferring user plane information, according to a type of transmitted information. That is, a set of logical channel types is defined for different data transfer services offered by the MAC layer. The logical channels are located above the transport channel, and are mapped to the transport channels.

The control channels are used for transfer of control plane information only. The control channels provided by the MAC layer include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting MBMS control information from the network to a UE. The DCCH is a point-to-point bi-directional channel used by UEs having an RRC connection that transmits dedicated control information between a UE and the network.

Traffic channels are used for the transfer of user plane information only. The traffic channels provided by the MAC layer include a dedicated traffic channel (DTCH) and a multicast traffic channel (MTCH). The DTCH is a point-to-point channel, dedicated to one UE for the transfer of user information and can exist in both uplink and downlink. The MTCH is a point-to-multipoint downlink channel for transmitting traffic data from the network to the UE.

Uplink connections between logical channels and transport channels include the DCCH that can be mapped to the UL-SCH, the DTCH that can be mapped to the UL-SCH and the CCCH that can be mapped to the UL-SCH. Downlink connections between logical channels and transport channels include the BCCH that can be mapped to the BCH or DL-SCH, the PCCH that can be mapped to the PCH, the DCCH that can be mapped to the DL-SCH, and the DTCH that can be mapped to the DL-SCH, the MCCH that can be mapped to the MCH, and the MTCH that can be mapped to the MCH.

An RLC layer belongs to the L2. The RLC layer provides a function of adjusting a size of data, so as to be suitable for a lower layer to transmit the data, by concatenating and segmenting the data received from an upper layer in a radio section. In addition, to ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides a retransmission function through an automatic repeat request (ARQ) for reliable data transmission. Meanwhile, a function of the RLC layer may be implemented with a functional block inside the MAC layer. In this case, the RLC layer may not exist.

A packet data convergence protocol (PDCP) layer belongs to the L2. The PDCP layer provides a function of header compression function that reduces unnecessary control information such that data being transmitted by employing IP packets, such as IPv4 or IPv6, can be efficiently transmitted over a radio interface that has a relatively small bandwidth. The header compression increases transmission efficiency in the radio section by transmitting only necessary information in a header of the data. In addition, the PDCP layer provides a function of security. The function of security includes ciphering which prevents inspection of third parties, and integrity protection which prevents data manipulation of third parties.

A radio resource control (RRC) layer belongs to the L3. The RLC layer is located at the lowest portion of the L3, and is only defined in the control plane. The RRC layer takes a role of controlling a radio resource between the UE and the network. For this, the UE and the network exchange an RRC message through the RRC layer. The RRC layer controls logical channels, transport channels, and physical channels in relation to the configuration, reconfiguration, and release of RBs. An RB is a logical path provided by the L1 and L2 for data delivery between the UE and the network. That is, the RB signifies a service provided the L2 for data transmission between the UE and E-UTRAN. The configuration of the RB implies a process for specifying a radio protocol layer and channel properties to provide a particular service and for determining respective detailed parameters and operations. The RB is classified into two types, i.e., a signaling RB (SRB) and a data RB (DRB). The SRB is used as a path for transmitting an RRC message in the control plane. The DRB is used as a path for transmitting user data in the user plane.

A Non-Access Stratum (NAS) layer placed over the RRC layer performs functions, such as session management and mobility management.

Referring to FIG. 2(a), the RLC and MAC layers (terminated in the eNB on the network side) may perform functions such as scheduling, automatic repeat request (ARQ), and hybrid automatic repeat request (HARQ). The RRC layer (terminated in the eNB on the network side) may perform functions such as broadcasting, paging, RRC connection management, RB control, mobility functions, and UE measurement reporting and controlling. The NAS control protocol (terminated in the MME of gateway on the network side) may perform functions such as a SAE bearer management, authentication, LTE_IDLE mobility handling, paging origination in LTE_IDLE, and security control for the signaling between the gateway and UE.

Referring to FIG. 2(b), the RLC and MAC layers (terminated in the eNB on the network side) may perform the same functions for the control plane. The PDCP layer (terminated in the eNB on the network side) may perform the user plane functions such as header compression, integrity protection, and ciphering.

Hereinafter, system information will be described.

Figure 3:
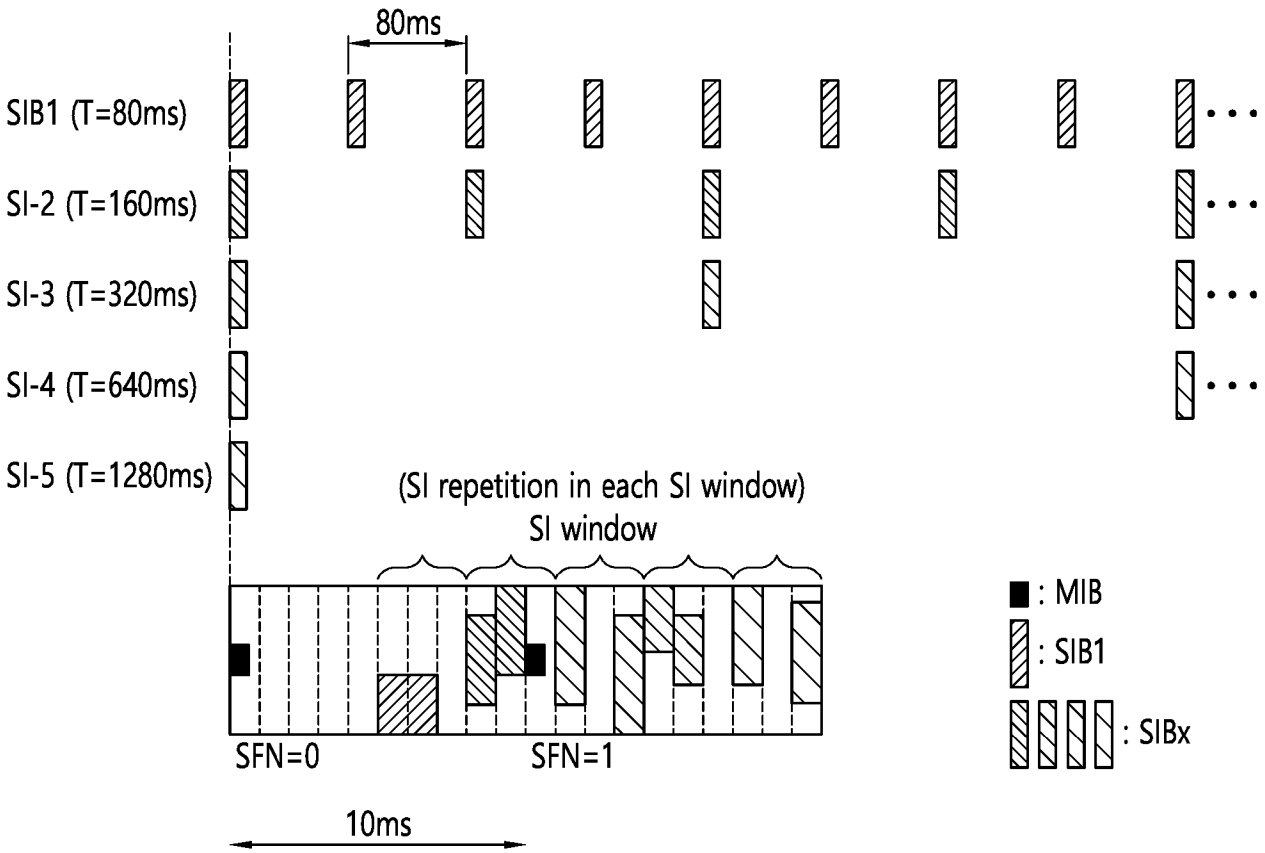
FIG. 3 shows an example of transmitting a master information block (MIB), system information block1 (SIB1), and other SIBs.

FIG. 3 shows an example of transmitting a master information block (MIB), system information block1 (SIB1), and other SIBs.

An LTE cell broadcasts basic parameters necessary for the operation of an IDLE_MODE UE and a CONNECTED_MODE UE via a plurality of separate information blocks.

Examples of information blocks include an MIB, SIB1, SIB2, and other SIBs (SIBn).

Figure 4:
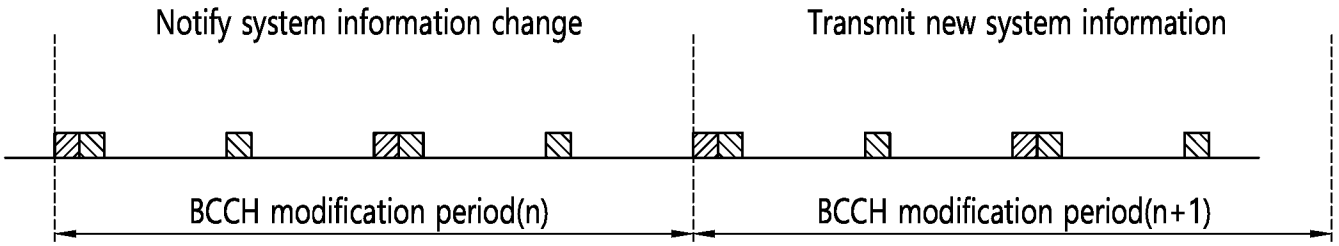
FIG. 4 shows an update of system information.

The MIB includes the most essential parameters needed for a UE to access a cell. Referring to FIG. 4, an MIB message is broadcast through a BCH according to a periodicity of 40 ms, and MIB transmission is repeated in all radio frames within the periodicity of 40 ms. The UE receives an SIB message using the parameters received via the MIB.

There are different types of SIBs.

SIB1 includes pieces of information associated with cell access, and particularly includes scheduling information on other SIB s (SIB2 to SIBn) than SIB1. SIBs having the same transmission periodicity among the SIBs other than SIB1 are transferred via the same system information (SI) message. Thus, scheduling information includes a mapping relationship between each SIB and an SI message. An SI message is transmitted within an SI window in a time domain, and each SI message is associated with one SI window. Since SI windows for different pieces of SI do not overlap, only one SI message is transmitted within an SI window. Thus, scheduling information includes the duration of an SI window and an SI transmission periodicity. Time/frequency for transmitting an SI message is determined by dynamic scheduling by a BS. SIB1 is broadcast through a downlink shared channel (DL SCH) according to a periodicity of eight radio frames (that is, 80-ms periodicity), and SIB1 is repeatedly retransmitted on a fifth subframe of an SFN-mod-2 radio frame within the 80-ms periodicity.

SIB2 includes necessary information for a UE to access a cell. SIB2 includes information on an uplink cell bandwidth, a random access parameter, and an uplink power control parameter.

SIB3 includes cell reselection information. SIB4 includes frequency information on a serving cell and intra-frequency information on a neighboring cell for cell reselection. SIB5 includes frequency information on a different E-UTRA and inter-frequency information on a neighboring cell for cell reselection. SIB6 includes frequency information on a UTRA and information on a UTRA neighboring cell for cell reselection. SIB7 includes frequency information on a GERAN for cell reselection. SIB8 includes information on a neighboring cell.

SIB9 includes a Home eNodeB (HeNB) identifier (ID). SIB10 to SIB12 include a public warning message, for example, for earthquake warning. SIB14 is used to support enhanced access barring and controls UEs to access a cell. SIB15 includes information needed to receive an MBMS at contiguous carrier frequencies. SIB16 include GPS time and coordinated universal time (UTC)-related information. SIB17 includes RAN auxiliary information.

Not all SIBs are always required to be present. For example, SIB9 is not needed in a mode where a wireless carrier establishes an HeNB, while SIB13 is not needed if a cell provides no MBMS.

System information is commonly applied to all UEs accessing a cell, and UEs need to always maintain up-to-date system information to perform an appropriate operation. When system information is changed, UEs need to know in advance the time the BS transmits new system information. In order that a BS and a UE mutually recognize a radio frame period for transmitting new system information, the concept of BCCH modification period is introduced in "3GPP TS 36.331 v9. 3.0," which is described in detail.

FIG. 4 shows an update of system information.

Referring to FIG. 4, a BS, which intends to update system information in an (n+1)th modification period, notifies in advance UEs of an update of system information in an nth modification period. A UE, which is notified the update of the system information in the nth modification period, receives and applies new system information at the very beginning of the (n+1)th modification period. When an update of system information is scheduled, the BS includes a system information modification indicator in a paging message. Generally, a paging message is a message received by an idle-mode UE. However, since an update of system information is notified through a paging message, a connected-mode UE also needs to receive a paging message at times and to identify an update of system information.

Hereinafter, access class barring (ACB) will be described.

Figure 5:
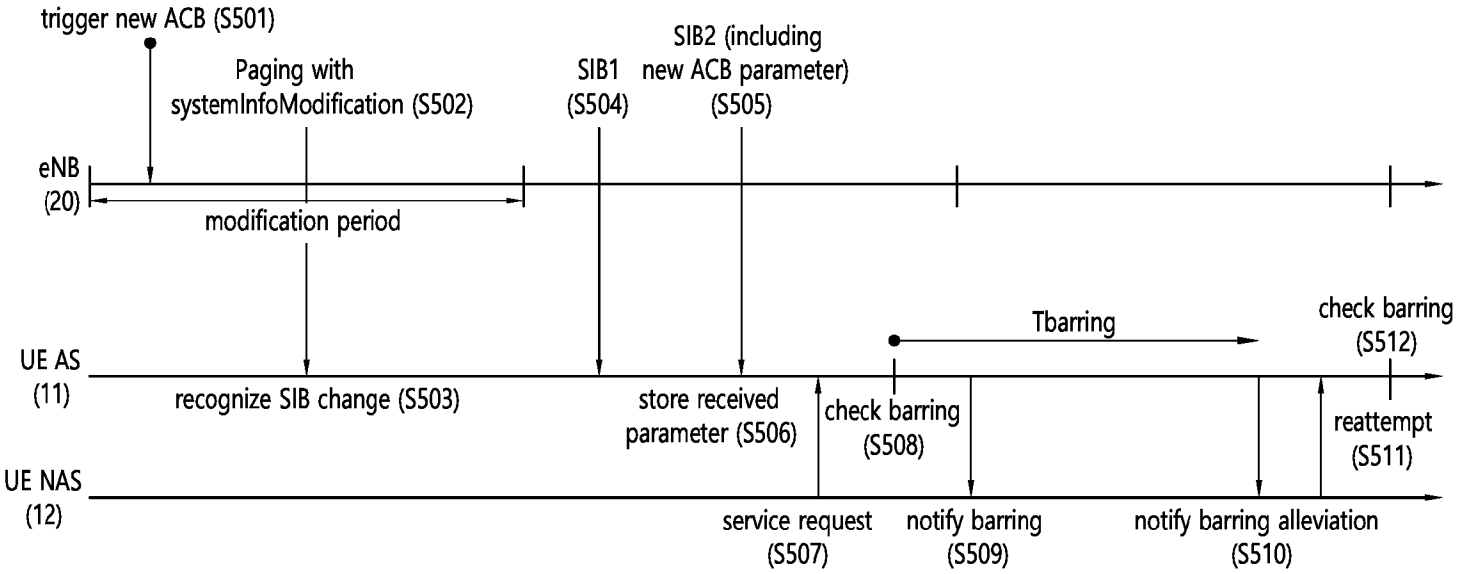
FIG. 5 shows an access class barring (ACB) operation.

FIG. 5 shows an ACB operation.

Referring to FIG. 5, ACB is a technique for controlling access of a UE to control system load, which includes a stage in which an eNB broadcasts barring information to UEs in advance and a stage in which UEs attempt to perform access based on a class that the UEs have and the barring information broadcast by the eNB 20. When new ACB information is triggered (S501), the eNB 20 may notify an UE AS 11 that SIB (SystemInformationBlock) information is to be changed soon due to the new ACB information, using a systeminfoModification IE of a paging (S502). The UE receiving the paging may recognize that the SIB information to be changed soon (S503). The systeminfoModication IE included in the paging is an indicator indicating that the SIB information is changed, and the indicator may have different forms according to embodiments.

The eNB 20 may notify the UE that the SIB information is to be changed soon through a paging in a modification period before broadcasting changed SIB information. Thereafter, the changed SIB information is broadcast in a next modification period.

After completing the modification period in which the paging is received, the UE receives SIB1 information to receive new SIB information (S504). There are several types of SIBs depending on purposes. SIB1 to SIB14 exist in Rel-11 LTE technology, and SIBs are continuously developed to support new functions of standard technologies. Among different SIBs, SIB1 may include scheduling information on other SIBs. Therefore, SIB1 needs to be received first in order to receive other SIB information.

Subsequently, the UE may receive SIB2 information including ACB information (S505). The UE AS 11 may store the ACB information (S506). A UE NAS 12 may send a service request to the UE AS 11 when a service, that is, communication, is needed (S507). Then, the UE AS 11 may determine whether to allow access based on the stored ACB information (S508). A UE is necessarily assigned a class with a value between 0 and 9. Further, the UE may further be assigned a class having a value of 11 to 15 for a special purpose. In addition, there is class 10 associated with an emergency call. The eNB 20 may restrict access to a particular class. In LTE technology, access to any designated one of classes 0 to 9 may not be restricted, and access to one or more designated classes among classes 11 to 15 for special purposes may be restricted.

Instead, the eNB 20 may provide a barring factor and barring time information with respect to classes 0 to 9. The barring factor may be a value ranging from 0 to 1. The UE selects one random value between 0 and 1 and compares the value with the barring factor. When the value selected by the UE is lower than the barring factor, it may be determined that access is allowed. When the value selected by the UE is higher than the barring factor, access is not allowed and the UE may notify the UE NAS 12 that access is not allowed (S509). When access is not allowed, the UE AS 11 may calculate a Tbarring value using the barring time information and the following equation. The following Equation 1 shows a method of calculating the Tbarring value according to the embodiment. A different Tbarring value may be calculated depending on an embodiment.

$$Tbarring=(0.7+0.6\times rand)\times ac-BarringTime \quad \text{[Equation 1]}$$

After Tbarring time, the UE AS 11 may notify the UE NAS 12 that it is possible to reattempt access (S510). Here, the UE NAS 12 reattempts to access the UE AS 11 (S511), and the UE AS 11 may perform a barring check again (S512). The process described in FIG. 5 may correspond to a general mobile originating (MO) call or signaling, that is, a service request triggered by a UE.

An emergency call triggered by a UE is slightly different from the above process. ACB information for an emergency call differs from an MO call or signaling. That is, ac-barringForEmergency information is provided instead of a barring factor or barring time information. The IE may indicate only whether an emergency call is allowed in a Boolean type. When the IE is set to true, the IE indicates that no emergency call is allowed, and access may finally be denied after checking a predetermined additional condition. Also, since no barring time information is provided, there is no stage in which the UE AS 11 notifies the UE NAS 12 whether access is possible after Tbarring. An ACB operation for an emergency call is described in more detail in FIG. 6.

Figure 6A:
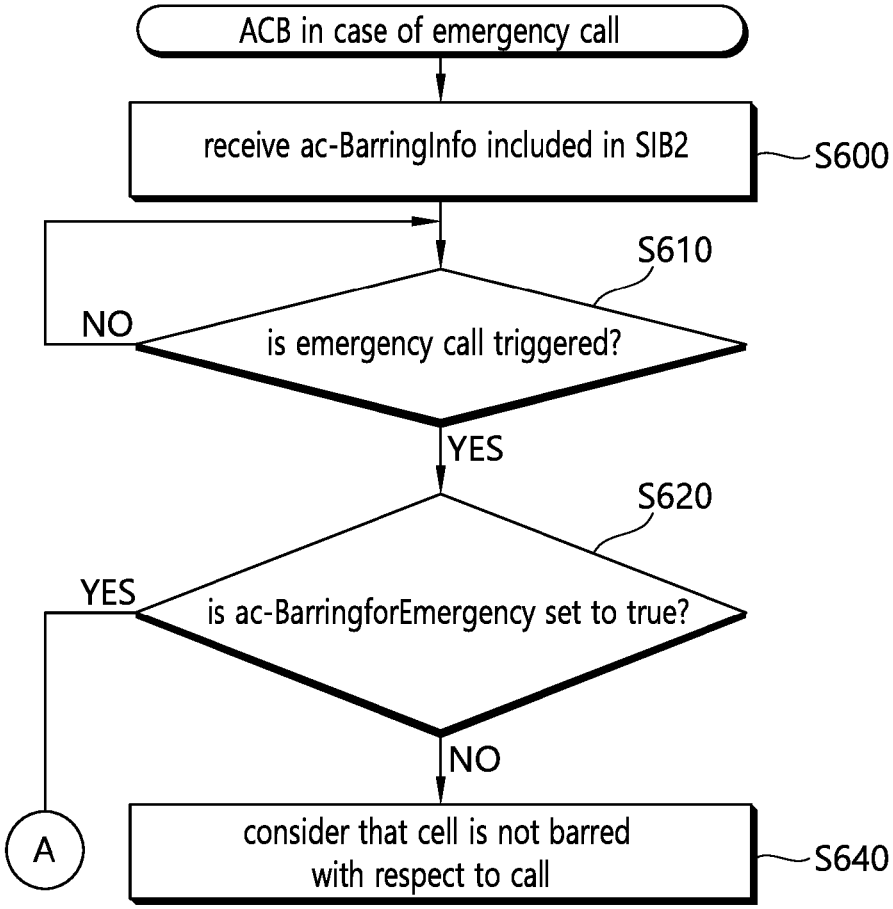
FIG. 6A and FIG. 6B show an ACB operation in case of an emergency call.
Figure 6B:
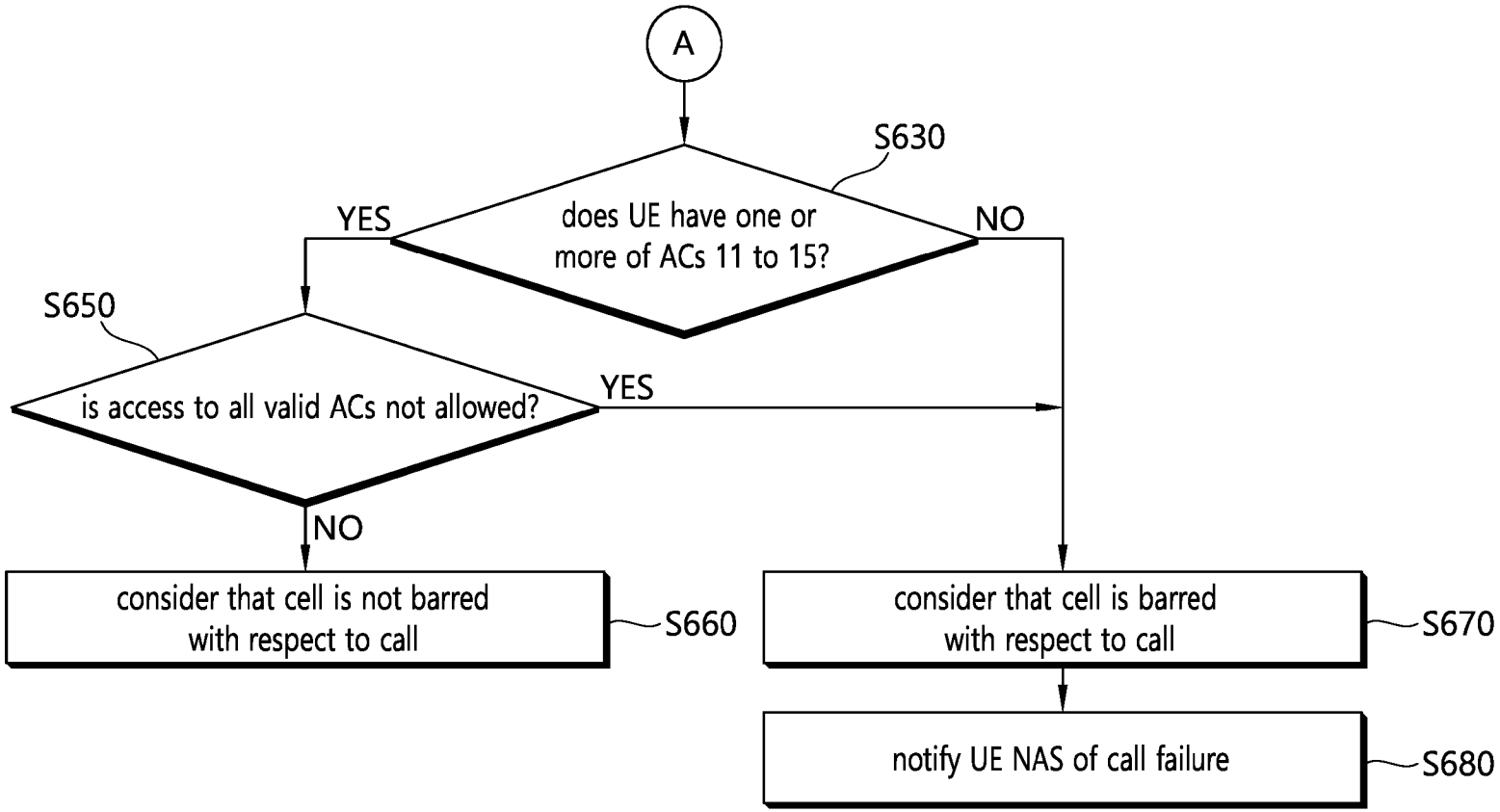

FIG. 6A and FIG. 6B show an ACB operation in case of an emergency call.

Referring to FIGS. 6A and 6B, a UE AS may receive SIB2 information broadcast by an eNB (S600). SIB2 may include an ac-BarringInfo IE including barring information. The UE AS may determine whether there is a request for an emergency call from a UE NAS (S610). When an emergency call is triggered, the UE AS may determine whether an ac-BarringForEmergency IE included in the ac-BarringInfo IE is set to true (S620). When the ac-BarringForEmergency IE is not true, the UE AS may regard the call as being allowed (S640). However, when the ac-BarringForEmergency IE is true, the UE AS may determine whether the UE further has one or more of classes 11 to 15 for special purposes, in addition to classes of 0 to 9 (S630).

When the UE does not have one or more of classes 11 to 15 for special purposes, the UE AS may consider that the call is not allowed (S670), and may notify the UE NAS that the call is not allowed (S680). When the UE has any one class for a special purpose, the UE AS may determine barring information on classes 11 to 15 included in the ac-BarringInfo IE (S650). In an embodiment, information in 5-bit bitmap format indicating whether to bar each special-purpose class may be included in the ac-BarringInfo IE. An ac-BarringForMO-Data IE in the ac-BarringInfo IE may have a 5-bit ac-BarringForSpecicalAC IE. In an embodiment, the respective bits may be sequentially mapped to AC11 to 15. When each bit is set to '1', a corresponding AC is considered to be barred. In this case, AC 12, 13, and 14 are valid in a home country, and AC 11 and 15 are valid only in an HPLMN/HEPLMN. When any one of the special-purpose classes possessed by the UE is allowed to access, access to the call may be regarded as being allowed (S660). Subsequently, the UE may attempt a random access process to attempt a connection with the eNB.

Hereinafter, a 5G RAN deployment scenario will be described.

A 5G RAN may be classified into a 'non-centralized deployment' scenario, a 'co-sited deployment with E-UTRA' scenario, and a 'centralized deployment' scenario according to a shape of deploying a function of a base station in a central unit and a distributed unit and according to whether it coexists with a 4G base station. In this specification, the 5G RAN, a gNB, a next generation node B, a new RAN, and a new radio base station (NR BS) may imply a newly defined base station for 5G. In addition, a basic function to be supported by the 5G RAN may be defined by Table 1.

TABLE 1

| | |
|---|---|
| Function group similar to E-UTRAN | |
| Function similar to E-UTRAN | Synchronization, Paging, Connection, Handover, Load balancing, Radio access network sharing, etc. |
| First new RAN function group | |
| Support network Slicing | Capable of supporting core network slice of RAN |
| Tight Interworking | Dual connectivity, Data flow aggregation function between 4G and 5G eNBs |
| Multi-connectivity | Function of simultaneously connecting one New RAN node and multiple New RAN nodes through Data flow combination |
| Support multi-RAT handover | Handover function through new direct interface (xX) between eLTE eNB and gNB |
| Second new RAN function group | |
| UE Inactive mode | Function enabling direct connection when new traffic occurs in UE in a state where a radio access resource is released and a wired connection (gNB-NGC) is established |
| Direct service | D2D improvement function |
| Non-3GPP Interworking | Interworking function between Non-3GPP(e.g., WLAN) and NR |
| Support Inter-RAT handover through Core | Support handover between E-UTRA and NR through Core |

Figure 7:
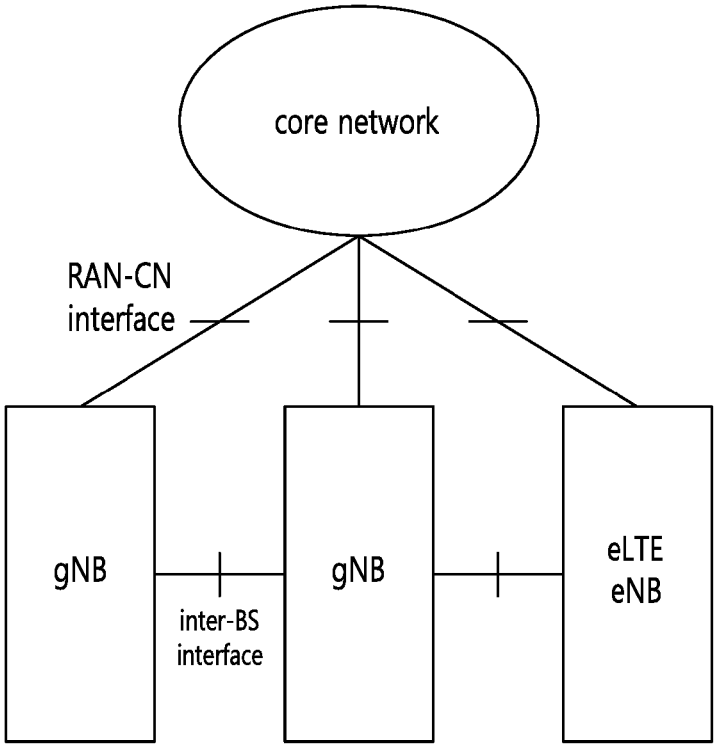
FIG. 7 shows a non-centralized deployment scenario.

FIG. 7 shows a non-centralized deployment scenario.

Referring to FIG. 7, a gNB may be configured in a horizontal manner without being split in a layered manner such as a CU and a DU. In this case, a protocol stack of a full set may be supported in each gNB. The non-centralized deployment scenario may be suitable for a macro cell or indoor hotspot environment. The gNB may be directly connected to another gNB or an eLTE eNB through an inter-BS interface. The gNB may be directly connected to a core network through an RAN-CN interface.

Figure 8:
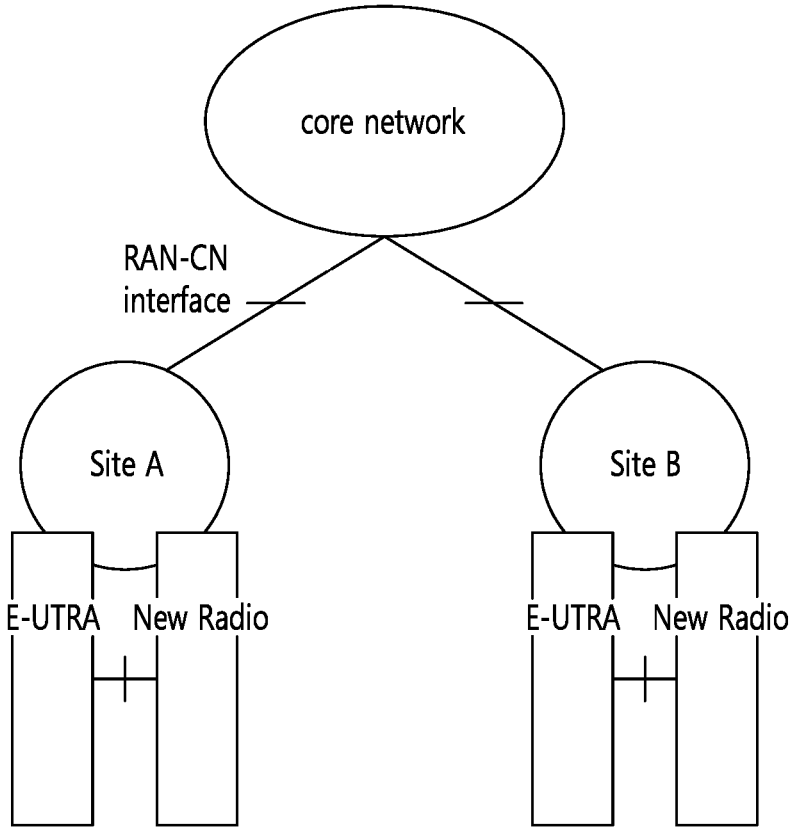
FIG. 8 shows a 'co-sited deployment with E-UTRA' scenario.

FIG. 8 shows a 'co-sited deployment with E-UTRA' scenario.

Referring to FIG. 8, a 5G transmission scheme (e.g., new radio) and a 4G transmission scheme (e.g., E-UTRAN) may be used together in one co-sited deployment. The co-sited deployment scenario may be suitable for an urban macro environment. When a gNB configuration is controlled by utilizing load balancing and multi-connectivity, the co-sited deployment scenario can utilize all frequency resources allocated to 4G/5G, and can extend cell coverage for a subscriber located at a cell boundary by using a low frequency.

Figure 9:
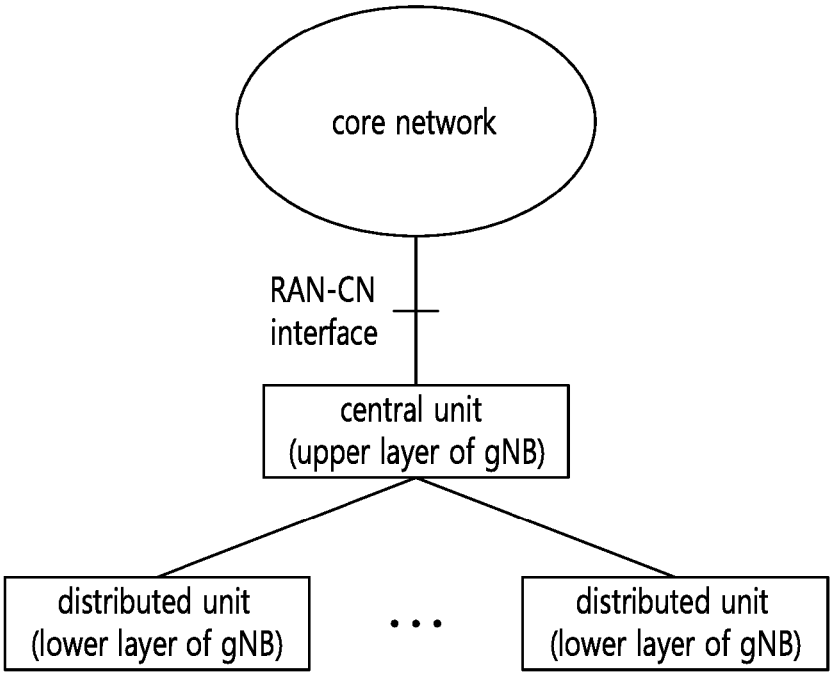
FIG. 9 shows a centralized deployment scenario.

FIG. 9 shows a centralized deployment scenario.

Referring to FIG. 9, a gNB may be split into a CU and a DU. That is, the gNB may operate by being split in a layered manner. The CU may perform a function of upper layers of the gNB, and the DU may perform a function of lower layers of the gNB. The centralized deployment scenario may be classified into a high performance transport type and a low performance transport type according to transmission capacity and delay characteristics of a transport device which connects the CU and the DU.

When the transport requires high performance, the CU accommodates many functions from the upper layer to the lower layer, whereas the DU accommodates only relatively a small number of lower layers in comparison with the CU. Therefore, processing of the CU may be overloaded, and it may be difficult to satisfy a requirement for transmission capacity, delay, and synchronization of the transport device. For example, when most of layers (RRC layers to physical layers) are deployed in the CU and only an RF function is deployed to the DU, it is estimated that a transmission band of the transport device is 157 Gbps and a maximum delay is 250 us, and thus the transport device requires an optical network with high capacity and low delay. On the other hand, since a transmission delay is short, when an optimal scheduling scheme is used, there is an advantage in that cooperative communication (e.g., CoMP) between gNBs can be more easily realized.

When the transport requires low performance, the CU accommodates an upper layer protocol function having a slightly low processing load, and thus there is room in the transmission capacity and delay of the transport device. For example, when only at least the upper layer (RRC layer) is deployed in the CU and all lower layers (PDCP layer to RF) lower than that are deployed in the DU, it is estimated that the transmission band of the transport device is 3 to 4 Gbps and the maximum delay is 10 ms. Therefore, there is room in the transmission band and the delay in comparison with the transport requiring high performance.

Meanwhile, the number of system information blocks is continuously increasing, and radio resources are required to broadcast a system information block. Thus, as the number of system information blocks increases, the quantity of radio resources required to broadcast a system information block also inevitably increases. To solve this problem, a new type of system information proposed. The new type of system information is not always broadcast by a network but may be transmitted from the network only when a UE request the system information. This type of system information may be referred to as an on-demand system information (OSI) or minimum system information (MSI).

Regarding on-demand system information, a UE may request system information in a cell, and a network receiving the request may transmit the requested system information to the UE. However, when the UE frequently requests system information, an uplink may become very congested. Therefore, it is necessary to newly propose a system information request procedure for minimizing uplink congestion when a UE requests system information. Hereinafter, a method for a UE to request a system information block and a device supporting the same will be described in detail according to an embodiment of the present invention.

In this specification, an RAN may not broadcast all system information in a cell. Alternatively, the RAN may broadcast some of the system information in the cell. The RAN may broadcast only one or more master information blocks (MIBs) and system information blocks of type 1 to type N−1. However, the RAN may not broadcast system information blocks of type N to type M. N and M are system information type numbers, where N is a system information type number lower than or equal to M, and M is the highest system information type number among the system information blocks supported by the cell.

In this specification, a system information request may be transmitted via at least one of the following control signaling:

a physical-layer resource, such as a PUCCH resource or a PRACH preamble resource, for example, a random access preamble ID (RAPID) or a time/frequency PRACH resource;

a layer-2 control signaling, such as an MAC control element, an RLC control PDU, or a PDCP control PDU;

an RRC message; and an NAS message.

In this specification, the system information request may include at least one of the following elements:

a value tag indicating system information currently stored in a UE;

the type number of a system information block requested;

a set of system information blocks requested;

UE identity;

part or all of UE capability information; and support of a particular feature, for example, support of eMBMS or support of sidelink.

In this specification, the RAN may be an LTE base station (i.e., eNB). Alternatively, the RAN may be a new RAT base station that may include a central unit and/or one or more distributed units. The RAN can manage a cell.

Figure 10:
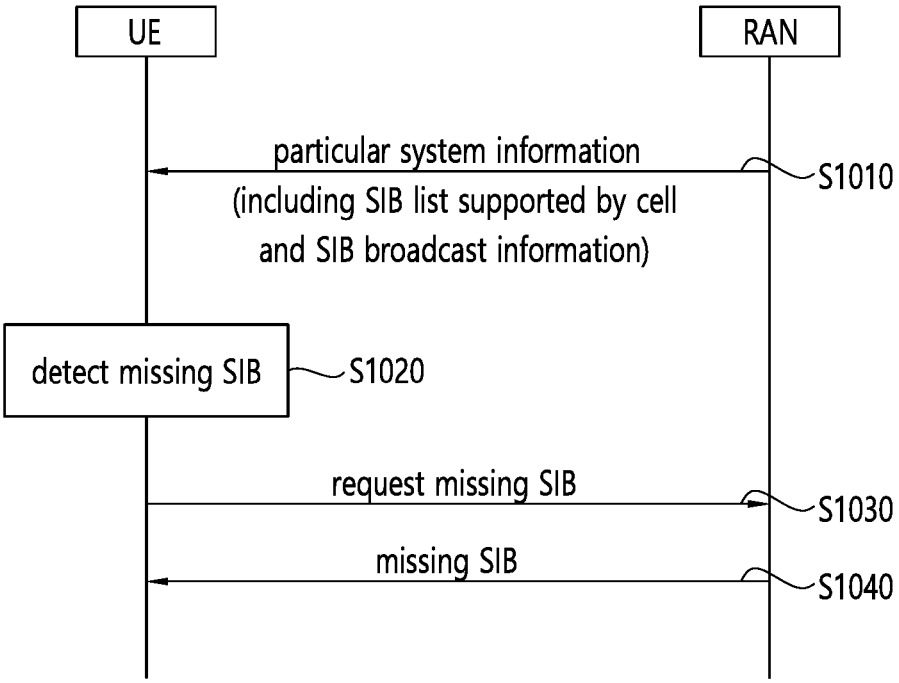
FIG. 10 illustrates a procedure in which a UE requests a missing SIB according to an embodiment of the present invention.

FIG. 10 illustrates a procedure in which a UE requests a missing SIB according to an embodiment of the present invention.

Some SIBs may be missing. For example, even though a cell supports an MBMS service, a D2D service, a V2X service, or WLAN interworking/integration, the cell may not broadcast an SIB associated with the MBMS service, the D2D service, the V2X service, or the WLAN interworking/integration.

Referring to FIG. 10, in step S1010, an RAN may broadcast which SIB or which feature is supported by a cell. An SIB supported by the cell may be listed in particular system information that is always broadcast. The particular system information may be system information that is always broadcast regardless of requests from the UE. For example, the particular system information may be an MIB or SIB 1. The particular system information may be broadcast in a BCCH period.

The particular system information may include a list of supported SIBs. In this specification, the list of supported SIBs may be defined as an SIB list. The particular system information may indicate whether the supported SIB is broadcast in a BCCH period in which system information is periodically broadcast. For example, the particular system information may indicate whether the supported SIB is broadcast in the current BCCH period. Alternatively, the particular system information may indicate whether the supported SIB is broadcast in the current BCCH period or the next BCCH period. The BCCH period may be one of a BCCH modification period or a BCCH repetition period. In this specification, information indicating whether a supported SIB is broadcast in a BCCH period may be defined as SIB broadcast information.

To save energy, to reduce overheads, and to save resources, different cells may broadcast different sets of SIBs. For example, a first cell may broadcast SIB1 and SIB2, while a second cell different from the first cell may broadcast SIB1, SIB2, and SIB3.

In step S1020, the UE may detect a missing SIB. The missing SIB may be detected based on the SIB list and the SIB broadcast information. For example, the missing SIB may be an SIB that is listed in the broadcast system information but is not broadcast in the current BCCH period. Alternatively, the missing SIB may be an SIB that is listed in the broadcast system information but is not broadcast/scheduled in the current BCCH period or the next BCCH period.

The missing SIB may be an SIB that the UE needs to read due to a supported feature. For example, the supported feature may be MBMS, D2D, V2X, or WLAN.

In step S1030, when the missing SIB is detected, the UE may transmit a system information request indicating the missing SIB to the RAN. Alternatively, the system information request may indicate a feature associated with the missing SIB. For example, the feature associated with the missing SIB may be MBMS, D2D, V2X, or WLAN.

In step S1040, upon receiving the system information request, the RAN may transmit necessary system information associated with the system information request to the UE through a random downlink RRC message.

According to an embodiment of the present invention, SI (system information) polling information may be defined. The RAN may trigger one or more system information requests from one or more UEs in the cell by transmitting SI polling information through UE-dedicated signaling. Alternatively, the RAN may trigger one or more system information requests from one or more UEs in the cell by transmitting SI polling information through broadcast signaling, such as system information or a paging message. The SI polling information may include at least one of the following elements.

(1) Bitmap

The SI polling information may include a bitmap where each bit indicates the access class of the UE. The bitmap may be stored, for example, in a USIM.

For example, when the bit of the bitmap corresponding to the access class stored in the UE indicates that the UE needs to request system information, the UE may transmit a system information request. Otherwise, the UE may not transmit a system information request.

(2) Probability Factor

The SI polling information may include a probability factor for controlling the uplink transmission of a system information request.

For example, the UE may draw a random number and may compare the drawn number with the probability factor. When the drawn number is less than or equal to the probability factor, the UE may transmit a system information request. Otherwise, the UE may not transmit a system information request.

(3) Value Tag

The SI polling information may include a value tag indicating system information to be transmitted when the UE requests system information.

For example, when the UE has already stored the system information corresponding to the value tag for the cell, the UE does not request system information. When the UE stores system information not corresponding to the value tag for the cell, the UE may request system information. Alternatively, when the UE does not store system information for the cell, the UE may request system information.

(4) Number of System Information Block Type

The SI polling information may include the number of the type of a system information block to be transmitted when the UE requests system information.

For example, when the UE has already stored a system information block type corresponding to the number of the system information block type for the cell, the UE does not request system information. When the UE stores system information not corresponding to the number of the system information block type for the cell, the UE may request system information. Alternatively, when the UE does not store system information for the cell, the UE may request system information.

(5) Set of System Information Blocks

The SI polling information may include a set of system information blocks to be transmitted when the UE requests system information.

For example, when the UE has already stored a set of system information blocks for the cell, the UE does not request system information. When the UE stores only a portion of the set of system information blocks for the cell, the UE may request system information. Alternatively, when the UE does not store system information for the cell, the UE may request system information.

(6) Set of UE IDs or List of UE IDs

The SI polling information may include a list of UE IDs that can request system information or a set of UE IDs that can request system information.

For example, the UE may receive I_received and N and may calculate I_calculated based on the ID of the UE (i.e., UE ID) and N. For example, I_calculated may be defined by Equation 2.

$$\text{I_calculated} = \text{UE ID modulo N} \quad \text{[Equation 2]}$$

That is, I_calculated may be the remainder obtained by dividing the ID of the UE by N. When calculated I_calculated is equal to received I_received, the UE may request system information. However, when calculated I_calculated is different from received I_received, the UE does not request system information.

(7) Entirety or Some of UE Capability Information

The SI polling information may include the entirety or some of UE capability information.

For example, the RAN may poll system information requests from UEs supporting a particular UE capability by including the UE capability information in the SI polling information. Upon receiving the SI polling information, only a UE supporting the particular UE capability can request system information.

(8) Support of Particular Feature

For example, the SI polling information may include support of eMBMS, support of a sidelink, and support of WLAN interworking/integration.

For example, the RAN may poll system information requests from UEs supporting a particular feature by including this element in the SI polling information. Upon receiving the SI polling information, only a UE supporting the particular feature can request system information. For example, when the SI polling information includes support of eMBMS, only a UE supporting eMBMS can request system information.

Figure 11:
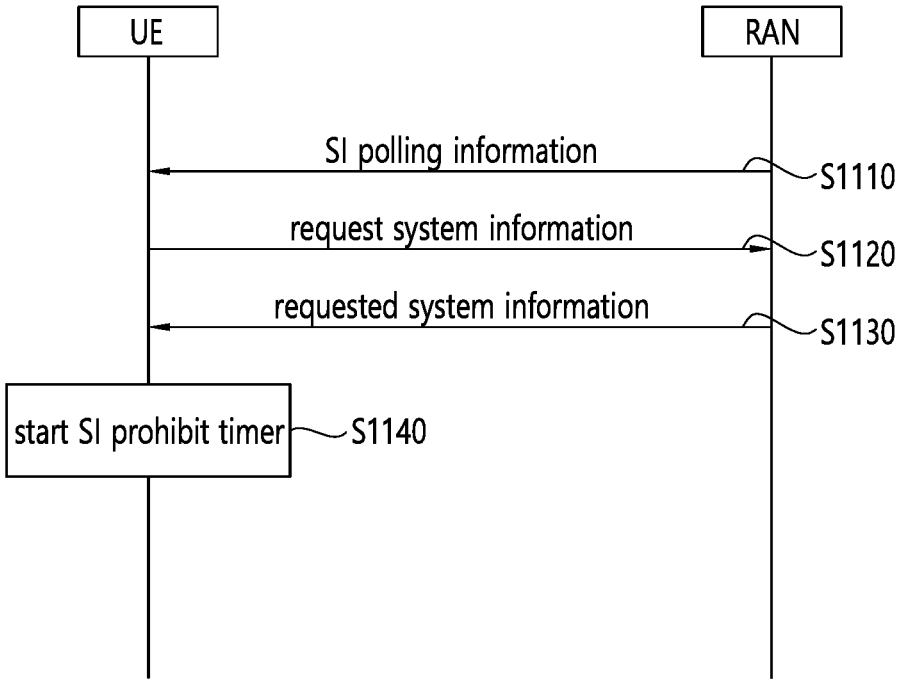
FIG. 11 illustrates a procedure in which a UE requests an SIB based on SI polling information received from a BS according to an embodiment of the present invention.

FIG. 11 illustrates a procedure in which a UE requests an SIB based on SI polling information received from a BS according to an embodiment of the present invention.

Referring to FIG. 11, in step S1110, the UE may receive SI polling information from an RAN. The SI polling information may include at least one of a bitmap, a probability factor, a value tag, a system information block type number, a system information block set, a UE ID set, a UE ID list, UE capability information, or support of a particular feature. The SI polling information may be received by the UE through broadcast signaling, such as system information. Alternatively, the SI polling information may be received by the UE through UE-dedicated signaling.

In step S1120, when at least one element included in the SI polling information triggers a system information request, the UE may initiate and transmit a system information request. For example, when the SI polling information includes a system information block type number and the UE does not have a system information block type corresponding to the system information block type number, the UE may transmit a system information request to the RAN.

In step S1130, the UE may receive requested system information from the RAN.

In step S1140, after receiving the system information for a cell or initiating/transmitting the system information request, the UE may start a timer. The timer may be an SI prohibit timer. In the embodiment of FIG. 11, the SI prohibit timer is started after the UE receives the requested system information, but is not limited thereto. The SI prohibit timer may be started after the UE initiates/transmits the system information request and before the UE receives the requested system information.

While the SI prohibit timer is running, the UE cannot initiates and transmits a system information request even though at least one of the above elements in the SI polling information triggers a system information request unless the UE makes uplink access due to other reasons. The other reasons may include, for example, a mobile originating call, mobile originating signaling, and a mobile terminating call.

Figure 12:
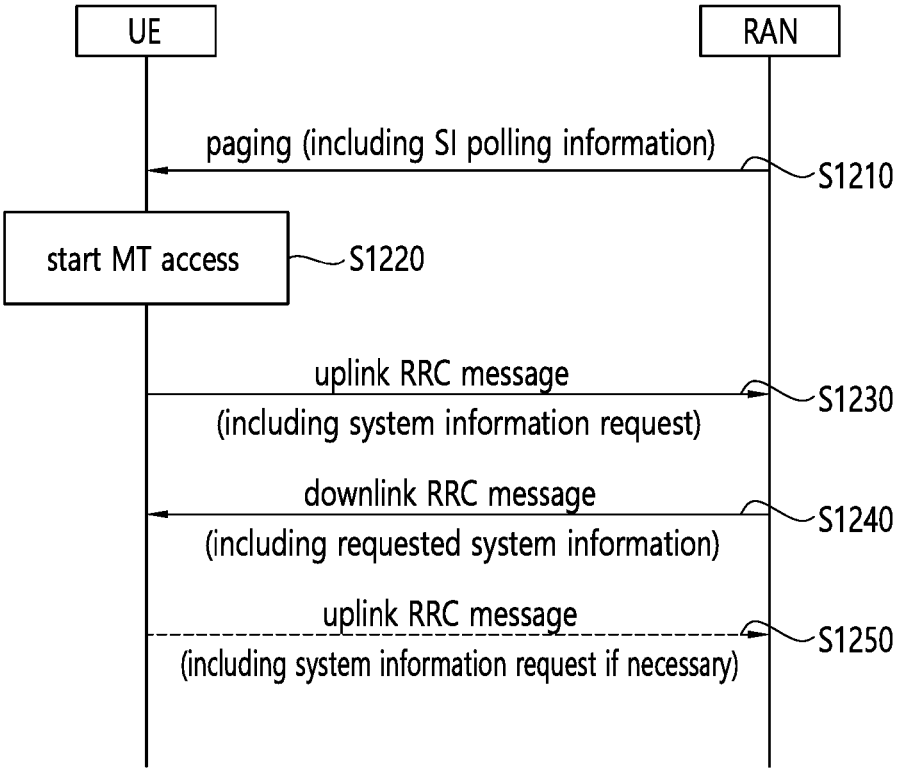
FIG. 12 illustrates a procedure in which a UE requests an SIB based on SI polling information received from a BS according to an embodiment of the present invention.

FIG. 12 illustrates a procedure in which a UE requests an SIB based on SI polling information received from a BS according to an embodiment of the present invention.

Referring to FIG. 12, in step S1210, the UE may receive SI polling information from an RAN. The SI polling information may include at least one of a bitmap, a probability factor, a value tag, a system information block type number, a system information block set, a UE ID set, a UE ID list, UE capability information, or support of a particular feature. The SI polling information may be received by the UE through a paging message. The paging message may be received, for example, on a PDSCH or PDCCH.

The RAN may trigger a system information request when a paging message needs to be transmitted to the UE. For example, the RAN may trigger a system information request when a paging message for a mobile terminating call needs to be transmitted to the UE.

When the RAN uses a paging message to transmit the SI polling information, the UE may monitor the SI polling information in a paging occasion for the UE.

In step S1220, the UE may start mobile terminating access.

In step S1230, when the UE receives the SI polling information through the paging message and at least one element included in the SI polling information triggers a system information request, the UE may initiate and transmit a system information request. Therefore, the reception time of the SI polling information may vary for different UEs depending on the paging occasion. The system information request may be transmitted through an uplink RRC message. For example, the uplink RRC message may be one of an RRC connection request message or an RRC connection resume request message for a mobile terminating call.

In step S1240, the UE may receive necessary system information associated with the system information request from the RAN. The necessary system information may refer to system information requested by the UE. The requested system information may be received via a downlink RRC message. For example, the downlink RRC message may be one of an RRC connection setup message, an RRC connection resume message, or an RRC connection reconfiguration message.

In step S1250, if necessary, the UE may transmit an uplink RRC message to the RAN. For example, the uplink RRC message may be one of an RRC connection setup complete message, an RRC connection resume complete message, or an RRC connection reconfiguration complete message. If necessary, the uplink RRC message may include a system information request.

Figure 13:
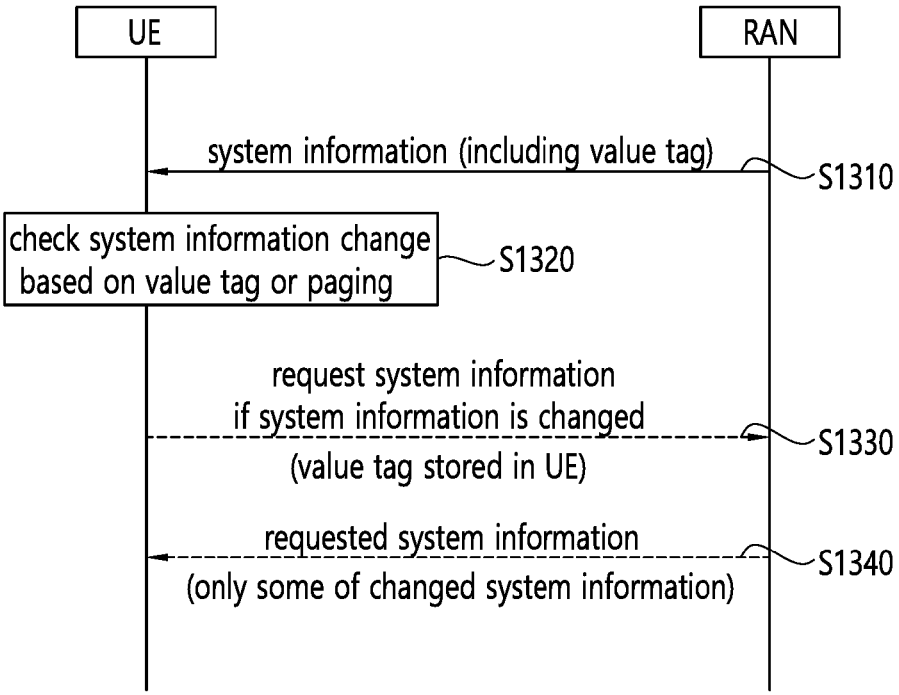
FIG. 13 illustrates a procedure in which a UE requests changed system information when system information is changed according to an embodiment of the present invention.

FIG. 13 illustrates a procedure in which a UE requests changed system information when system information is changed according to an embodiment of the present invention.

When a network changes a particular type of on-demand system information, the network may broadcast the changed system information or all system information during a specified period. For example, the specified period may be a modification period. The specified period may be set in master system information or any necessary system information.

Referring to FIG. 13, in step S1310, the network may indicate to the UE that on-demand system information is to be changed by broadcast signaling during a specified period. For example, the broadcast signaling may be essential system information or a paging message. This indication may include a value tag for a particular type of system information or a common value tag for all system information. Additionally, the network may indicate to the UE whether on-demand system information is broadcast in the next period (e.g., the next modification period). When the network intends to broadcast on-demand system information in the next period, the network may indicate to the UE whether all system information is broadcast or only changed on-demand system information is broadcast. Regardless of on-demand system information, the network may broadcast all system information or changed on-demand system information without a request by the UE.

In step S1320, the UE may check whether the on-demand system information is changed. For example, the UE may determine whether the on-demand system information is changed based on the value tag. For example, the UE may determine whether the on-demand system information is changed based on the paging message.

In step S1330, when the UE recognizes that the on-demand system information is changed and the on-demand system information is not scheduled to be broadcast, the UE may trigger a system information request for the on-demand system information. On the other hand, when the UE recognizes that the on-demand system information is changed and the on-demand system information is scheduled to be broadcast, the UE may not trigger a system information request for the on-demand system information. When the network broadcasts only the changed on-demand system information but the UE requires a particular type of system information that is different from the changed on-demand system information, the UE may trigger a system information request for the particular type of system information. Additionally, when the UE triggers a system information request, the value tag stored in the UE may be transmitted to an RAN.

In step S1340, the UE may receive the changed system information. Upon receiving the changed system information, the UE may ignore a setting related to the previously stored changed system information. Alternatively, the UE may receive all system information.

Figure 14:
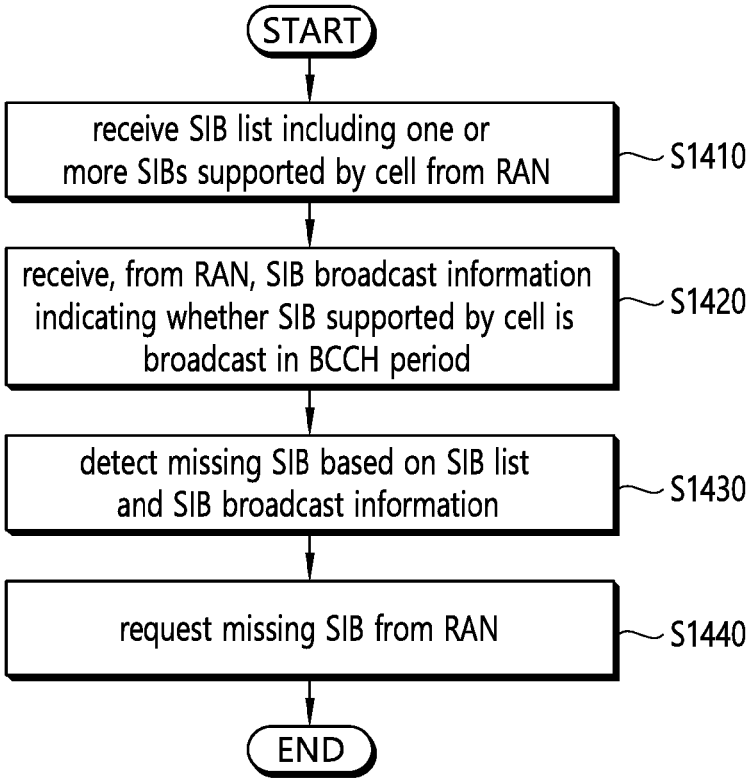
FIG. 14 is a block diagram illustrating a method in which a UE requests an SIB according to an embodiment of the present invention.

FIG. 14 is a block diagram illustrating a method in which a UE requests an SIB according to an embodiment of the present invention.

Referring to FIG. 14, in step S1410, the UE may receive an SIB list including one or more SIBs supported by a cell from an RAN. The SIB list may be received by the UE via particular system information. The particular system information may be system information that is always broadcast by the RAN.

In step S1420, the UE may receive, from the RAN, SIB broadcast information indicating whether an SIB supported by the cell is broadcast in a BCCH period. The BCCH period may be one of a BCCH modification period or a BCCH repetition period. The SIB broadcast information may be received by the UE via particular system information. The particular system information may be system information that is always broadcast by the RAN.

In step S1430, the UE may detect a missing SIB based on the SIB list and the SIB broadcast information.

The missing SIB may be an SIB that is not broadcasted in the BCCH period among the SIBs included in the SIB list. The BCCH period may be the current BCCH period or the next BCCH period.

The missing SIB may be an SIB that the UE needs to receive from the RAN in order to perform a particular service. The particular service may include at least one of an MBMS service, a D2D service, a V2X service, or WLAN interworking.

In step S1440, the UE may request the missing SIB from the RAN. The missing SIB may be requested from the RAN by indicating a service associated with the missing SIB. In response to the request, the UE may receive the missing SIB from the RAN.

The UE may receive a probability factor from the RAN. In this case, when a random number drawn by the UE is less than or equal to the probability factor, the missing SIB may be requested from the RAN.

The UE may receive, from the RAN, a value tag indicating system information to be requested from the RAN. In this case, when the missing SIB is system information indicated by the value tag, the missing SIB may be requested from the RAN.

The UE may receive, from the RAN, a number of the type of an SIB to be requested from the RAN. In this case, when the missing SIB matches the number of the type of the SIB to be requested, the missing SIB may be requested from the RAN.

The UE may receive, from the RAN, a set of SIBs to be requested from the RAN. In this case, when the missing SIB is included in the set of SIBs to be requested, the missing SIB may be requested from the RAN.

Figure 15:
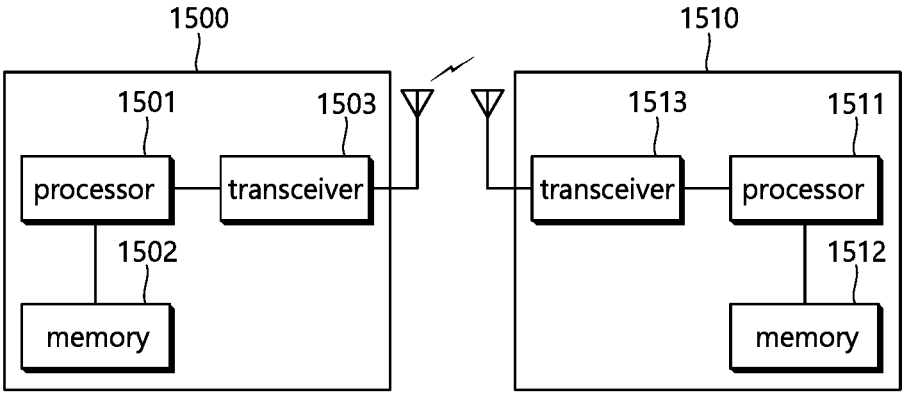
FIG. 15 is a block diagram illustrating a wireless communication system according to the embodiment of the present invention.

FIG. 15 is a block diagram illustrating a wireless communication system according to the embodiment of the present invention.

A BS 1500 includes a processor 1501, a memory 1502 and a transceiver 1503. The memory 1502 is connected to the processor 1501, and stores various types of information for driving the processor 1501. The transceiver 1503 is connected to the processor 1501, and transmits and/or receives radio signals. The processor 1501 implements proposed functions, processes and/or methods. In the above embodiment, an operation of the BS may be implemented by the processor 1501.

A UE 1510 includes a processor 1511, a memory 1512 and a transceiver 1513. The memory 1512 is connected to the processor 1511, and stores various types of information for driving the processor 1511. The transceiver 1513 is connected to the processor 1511, and transmits and/or receives radio signals. The processor 1511 implements proposed functions, processes and/or methods. In the above embodiment, an operation of the UE may be implemented by the processor 1511.

The processor may include an application-specific integrated circuit (ASIC), a separate chipset, a logic circuit, and/or a data processing unit. The memory may include a read-only memory (ROM), a random access memory (RAM), a flash memory, a memory card, a storage medium, and/or other equivalent storage devices. The transceiver may include a base-band circuit for processing a wireless signal. When the embodiment is implemented in software, the aforementioned methods can be implemented with a module (i.e., process, function, etc.) for performing the aforementioned functions. The module may be stored in the memory and may be performed by the processor. The memory may be located inside or outside the processor, and may be coupled to the processor by using various well-known means.

Various methods based on the present specification have been described by referring to drawings and reference numerals given in the drawings based on the aforementioned examples. Although each method describes multiple steps or blocks in a specific order for convenience of explanation, the invention disclosed in the claims is not limited to the order of the steps or blocks, and each step or block can be implemented in a different order, or can be performed simultaneously with other steps or blocks. In addition, those ordinarily skilled in the art can know that the invention is not limited to each of the steps or blocks, and at least one different step can be added or deleted without departing from the scope and spirit of the invention.

The aforementioned embodiment includes various examples. It should be noted that those ordinarily skilled in the art know that all possible combinations of examples cannot be explained, and also know that various combinations can be derived from the technique of the present specification. Therefore, the protection scope of the invention should be determined by combining various examples described in the detailed explanation, without departing from the scope of the following claims.

What is claimed is:

1. A method[for requesting, by a user equipment (UE), a system information block (SIB) in a wireless communication system], [the method] comprising:

receiving, *by a user equipment* (*UE*) *from a base station, a first system information block* (*SIB*) *including* (*i*) an SIB list [comprising one or more SIBs] *including at least one SIB* supported by a cell [from a radio access network (RAN)] *and* (*ii*) *broadcast status information*

*representing whether the at least one SIB is being broadcasted in a broadcast control channel (BCCH) modification period*;

[receiving, from the RAN, SIB broadcast information informing the UE whether an SIB supported by the cell is broadcast in a broadcast control channel (BCCH) period;]

detecting[a missing], *by the UE, an* SIB *which is included in the SIB list and not broadcast in the BCCH modification period,* based on the SIB list and the [SIB] broadcast *status* information; and

[requesting the missing SIB from the RAN, wherein the missing SIB is an SIB that is not broadcast in the BCCH period among the SIBs comprised in the SIB list]

*transmitting, by the UE to the base station, a request for the SIB.*

2. The method of claim 1, wherein the BCCH *modification* period is a current BCCH *modification* period or a next BCCH *modification* period.

[3. The method of claim 1, wherein the BCCH period is one of a BCCH modification period or a BCCH repetition period.]

4. The method of claim 1, wherein the [missing] SIB is an SIB that the UE needs to receive from the [RAN] *base station* in order to perform a particular service.

5. The method of claim 4, wherein the particular service [comprises] *includes* at least one of a multimedia broadcast/multicast service (MBMS) service, a device-to-device (D2D) service, a vehicle-to-everything (V2X) service, or wireless local area network (WLAN) interworking.

6. The method of claim 1, wherein the [missing] SIB is requested from the [RAN] *base station* by informing the [RAN] *base station* of a service [associated with] *related to* the [missing] SIB.

[7. The method of claim 1, wherein the SIB list and the SIB broadcast information are received by the UE via particular system information.]

8. The method of claim [7] *1*, wherein the [particular system information] *first SIB* is *a* system information *block* that is always [broadcast] *broadcasted* by the [RAN] *base station*.

9. The method of claim 1, further comprising:

receiving a probability factor from the [RAN] *base station*, wherein, based on a random number drawn by the UE that is less than or equal to the probability factor, the [missing] SIB is requested from the [RAN] *base station*.

10. The method of claim 1, further comprising:

receiving, from the [RAN] *base station*, a value tag informing the UE of system information to be requested from the [RAN] *base station*, wherein, based on the [missing] SIB that is the system information informed by the value tag, the [missing] SIB is requested from the [RAN] *base station*.

11. The method of claim 1, further comprising:

receiving, from the [RAN] *base station*, a number of a type of SIB to be requested from the [RAN] *base station*, wherein, based on the [missing] SIB that matches the number of the type of SIB to be requested, the [missing] SIB is requested from the [RAN] *base station*.

12. The method of claim 1, further comprising:

receiving, from the [RAN] *base station*, a set of SIBs to be requested from the [RAN] *base station*, wherein based on the [missing] SIB in the set of SIBs to be requested, the [missing] SIB is requested from the [RAN] *base station*.

13. The method of claim 1, further comprising:

receiving the [missing] SIB from the [RAN] *base station* in response to the request.

14. A user equipment (UE)[for requesting a system information block (SIB) in a wireless communication system], [the UE] comprising:

a memory;

a transceiver; and a processor [functionally in communication with the memory and the transceiver] *to connect the memory and the transceiver*, wherein the processor is configured to:

control the transceiver to receive, *from a base station, a first system information block (SIB) including (i)* an SIB list [comprising one or more SIBs] *including at least one SIB* supported by a cell [from a radio access network (RAN)] *and (ii) broadcast status information representing whether the at least one SIB is being broadcasted in a broadcast control channel (BCCH) modification period*;

[control the transceiver to receive, from the RAN, SIB broadcast information informing the UE whether an SIB supported by the cell is broadcast in a broadcast control channel (BCCH) period;]

detect [a missing] *an* SIB *which is included in the SIB list and not broadcast in the BCCH modification period,* based on the SIB list and the [SIB] broadcast *status* information; and control the transceiver to [request the missing SIB from the RAN, wherein the missing SIB is an SIB that is not broadcast in the BCCH period among the SIBs comprised in the SIB list] *transmit, to the base station, a request for the SIB.*

*15. The UE of claim 14, wherein the BCCH modification period is a current BCCH modification period or a next BCCH modification period.*

*16. The UE of claim 14, wherein the first SIB is a system information block that is always broadcasted by the base station.*

*17. An apparatus configured to control a user equipment (UE), comprising:*

*a memory: and*

*a processor to connect the memory, wherein the processor is configured to:*

*receive, from a base station, a first system information block (SIB) including (i) an SIB list including at least one SIB supported by a cell and (ii) broadcast status information representing whether the at least one SIB is being broadcasted in a broadcast control channel (BCCH) modification period;*

*detect an SIB which is included in the STB list and not broadcast in the BCCH modification period, based on the SIB list and the broadcast status information; and*

*transmit, to the base station, a request for the SIB.*

*18. The apparatus of claim 17, wherein the BCCH modification period is a current BCCH modification period or a next BCCH modification period.*

*19. The apparatus of claim 17, wherein the first SIB is a system information block that is always broadcasted by the base station.*

* * * * *